April 21, 1925.  1,534,772
W. C. DE ARMOND ET AL
CARBONATOR AND DRAFT ARM FOR SODA WATER
Filed July 25, 1924   5 Sheets-Sheet 1

April 21, 1925. 1,534,772
W. C. DE ARMOND ET AL
CARBONATOR AND DRAFT ARM FOR SODA WATER
Filed July 25, 1924 5 Sheets-Sheet 3

April 21, 1925.

W. C. DE ARMOND ET AL 1,534,772

CARBONATOR AND DRAFT ARM FOR SODA WATER

Filed July 25, 1924    5 Sheets-Sheet 4

INVENTORS
William P. De Armond
William Ray H. Watt.
BY
Niedersheim Fairbanks
ATTORNEYS.

April 21, 1925.  
W. C. DE ARMOND ET AL  
1,534,772  
CARBONATOR AND DRAFT ARM FOR SODA WATER  
Filed July 25, 1924  
5 Sheets-Sheet 5

INVENTORS  
William P. De Armond  
William Ray F. Watt  
BY  
ATTORNEYS.

Patented Apr. 21, 1925.

1,534,772

UNITED STATES PATENT OFFICE.

WILLIAM C. DE ARMOND AND WILLIAM RAY H. WATT, OF PHILADELPHIA, PENNSYLVANIA.

CARBONATOR AND DRAFT ARM FOR SODA WATER.

Application filed July 25, 1924. Serial No. 728,066.

*To all whom it may concern:*

Be it known that we, WILLIAM C. DE ARMOND and WILLIAM RAY H. WATT, citizens of the United States, residing in the city and county of Philadelphia, and State of Pennsylvania, have invented a new and useful Carbonator and Draft Arm for Soda Water, of which the following is a specification.

Our invention relates to a new and novel despensing apparatus such as is used in soda water fountains, and relates more particularly to a novel combination of such dispensing apparatus and carbonating device, for carbonating the water and subsequently dispensing the charged liquid.

Our invention further relates to a novel carbonating and dispensing apparatus including a liquid measuring device for said charged water whereby a desired quantity of the charged water will always be measured and ready for use, to be supplied to the dispensing faucet.

With the above ends in view our invention consists of a novel charging chamber, measuring chamber and dispensing valve for the same whereby gas and water will be controlled automatically by a single manual operation of a controlling valve.

Our invention further consists of other novel features of construction which will appear in the course of the following description in which reference is made in the accompanying drawings, in which.

Figure 1:
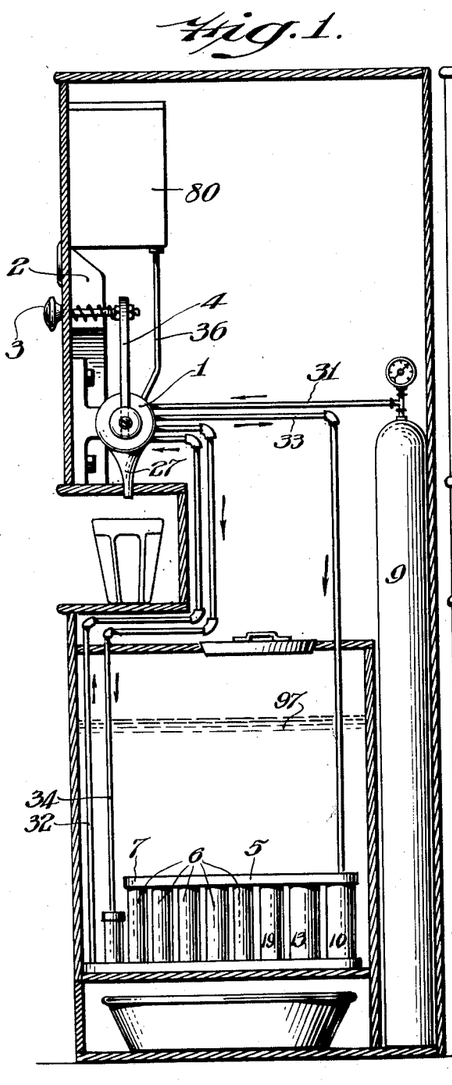
Fig. 1 represents a side elevation partly in section, of a novel dispensing device embodying my invention.

Referring to the drawings, 1 designates an outer casing of our novel control and dispensing valve shown in Fig. 1, which in the particular embodiment shown, is adapted to be actuated by a coin operated device 2, having a handle 3, and the arm 4. 5 designates a battery of charging chambers comprising the vertical cylinders 6, disposed between the upper lid 7 and the lower manifold 8.

Figure 8:
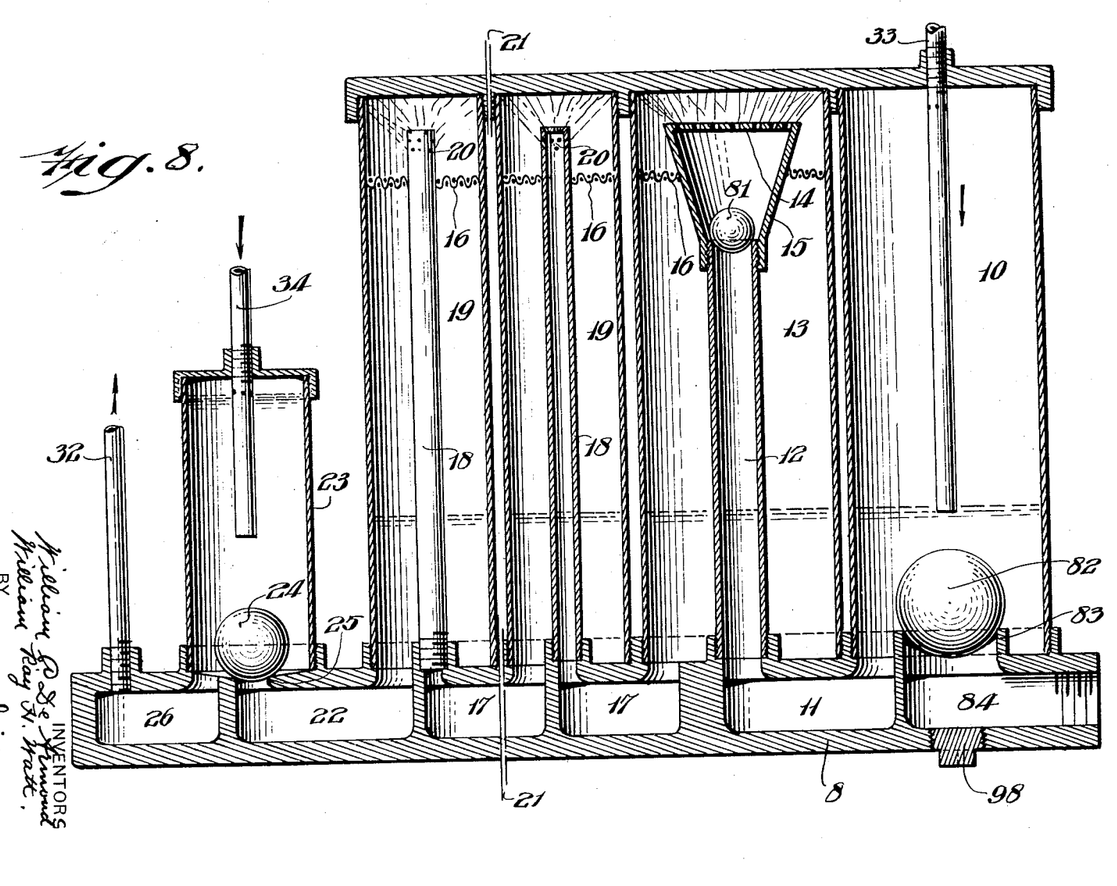
Fig. 8 represents a vertical section of the charging or absorption battery, as well as of the measuring chamber.
Figure 9:
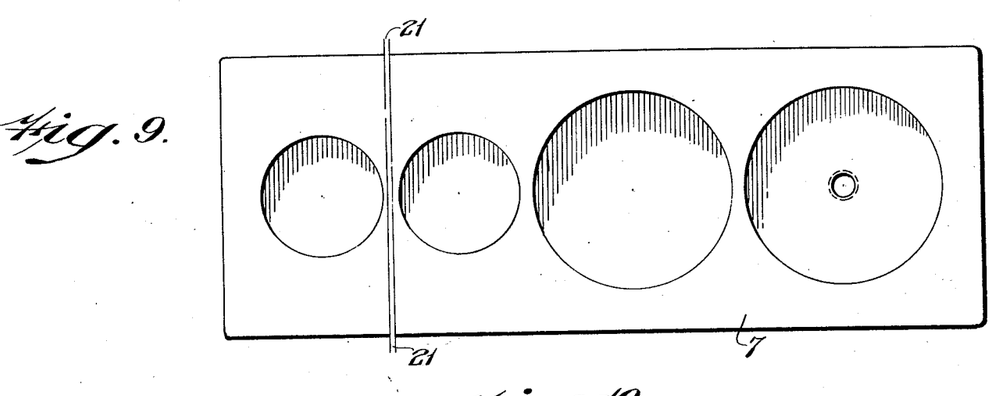
Fig. 9 represents a plan view of the upper lid of the charging battery.
Figure 10:
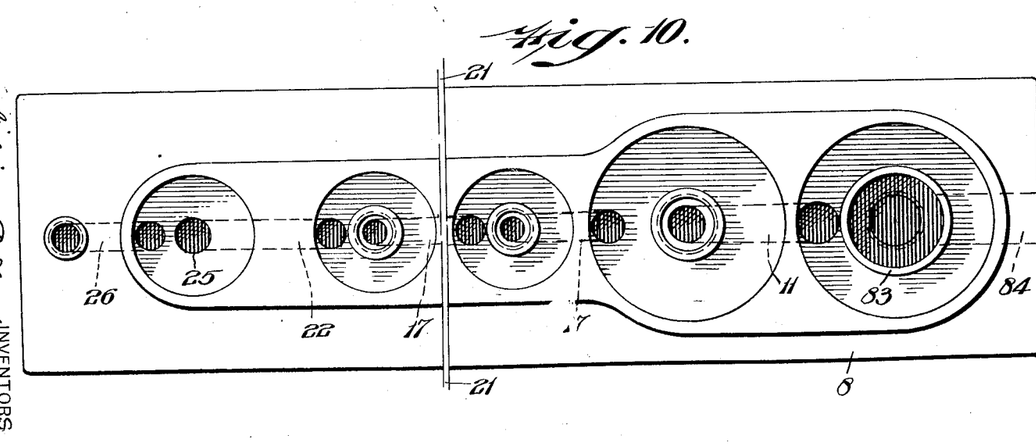
Fig. 10 represents a plan view of the lower manifold of the charging and measuring chambers.
Figure 11:
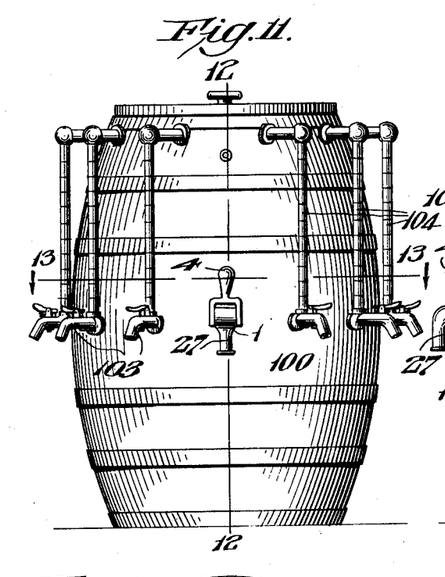
Fig. 11 represents a front elevation of a manifold form of our novel dispensing and carbonating device.

During the normal, inoperative or closed position of the valve 1, which is to be described in detail hereinafter, the live gas from the supply tank 9 passes through properly positioned ports in said valve 1 into the first absorption chamber 10 of the battery 5, through the pipes 31 and 33 as shown in Fig. 1, from which it forces the water out, through the passageway 11 in the manifold 8, into the vertical spray pipe 12 of the adjacent absorption chamber 13, and forces the water comingled with the gas, out through the perforated top of 14, of the funnel 15, in the form of a spray, from whence it descends again through the screen 16, to the bottom of the chamber 13. From the bottom of the chamber 13 the water, urged by the pressure of the gas, passes through the second passageway 17 in the manifold 8, into the vertical spray pipe 18, within the adjacent chamber 19, of the absorption battery 5, and out through the upper perforated end 20 thereof, in the form of a spray, from whence it descends again to the bottom of said chamber 19. The path of the water and gas and the solution of the latter and the former, continues through several similar charging or absorption chambers 19 as shown in Figs. 1 and 8, (a number of said chambers having been omitted in Fig. 8, as indicated by the break 21), each of said chambers containing a similar vertical spray pipe 18 having a perforated end 20 and a screen 16, immediately below said perforated end, there being also similar passageway 17 interconnecting the bottom of each absorption chamber with the vertical spray pipe of the next succeeding chamber 18. As shown in Figs. 1 and 8, the first two chambers 10 and 13 are of considerably larger diameter than the succeeding chamber 19. The reason for this enlargement of the chambers of the first two stages of absorption, is to accommodate a relatively larger volume of gas in these chambers since the amount of gas absorbed in these stages is smaller, thereby tending to equalize the pressure at the beginning and at the end of the absorption process. From the last of the series of charging or absorption chambers 19, the water fully charged with the carbonating gas, passes through the passageway 22 into the measuring or volume cylinder 23, past the ball check valve 24, which rests on the valve seat 25 by the force of gravity. In the normal, inoperative or closed position of the valve 1 referred to above, the gas feeding pipe 34 entering the top of the volume chamber 23, as well as the exit pipe 32 is closed, thereby confining a substantially fixed and predetermined amount of charged or carbonated water within chamber 23 and the adjacent communicating passageway 26 in the manifold 8, connecting said volume chamber 23 with the exit pipe 32.

In the inclined, open or operative discharging position of the valve, the pressure of the gas is switched from the pipe 33 of absorption chambers 10, to the gas pipe 34 entering the top of the volume chamber 23, while the pipe 32 is connected with the discharge faucet 27, so that the quantity of carbonated water confined in the volume chamber 23, (being unable to return into the absorption chambers due to the check valve 24), will be forced out by the pressure of the carbonating gas from the supply tank 9, through the pipe 32 into and through the discharge faucet 27.

Figure 3:
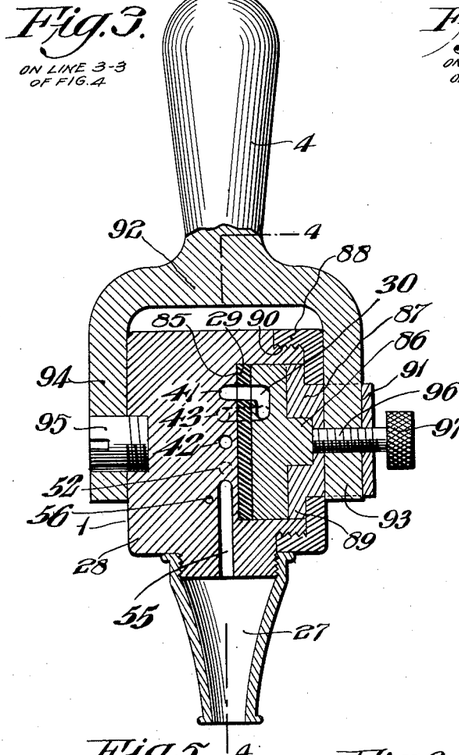
Fig. 3 represents a section on line 3—3 of Fig. 4, showing our novel valve construction.
Figure 4:
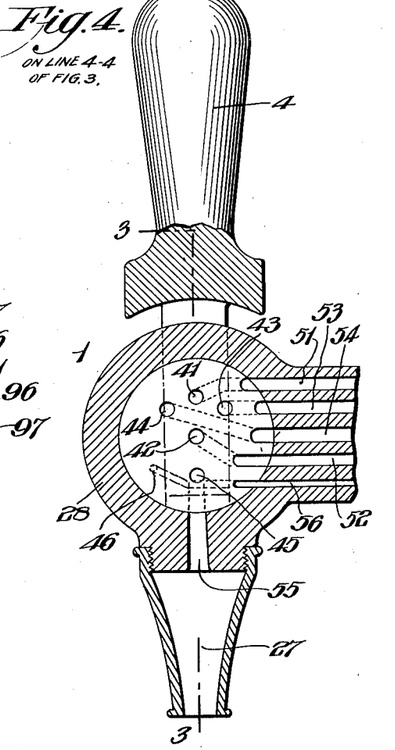
Fig. 4 represents a section on line 4—4 of Fig. 3, showing our novel valve construction.
Figure 5:
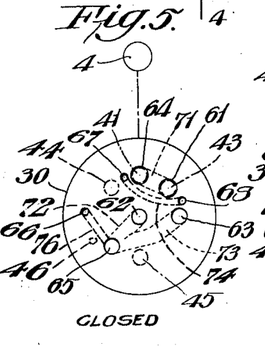
Figs. 5, 6 and 7 are diagrammatic views of the valve disc in three different positions thereof.
Figures 6, 7:
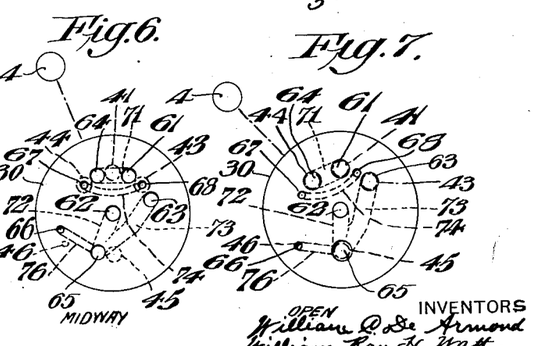

In Figs. 3 and 4, there are shown sectional views of the valve 1, while in Figs. 5, 6 and 7 there are shown the closed intermediate and opened positions respectively of the movable or disc portion 30 of my novel valve 1. In these figures, 28 designates the stationary casing of the valve 1, 29 the stationary packing gasket secured to the valve face of the casing 28 and having ports therethrough corresponding to and coinciding with the ports in the casing 28, and the movable disc 30 of the valve, having apertures therethrough properly positioned with respect to the ports of the stationary casing as well as bypasses or passageways within said disc 30, interconnecting particular ports in said disc.

Accordingly the valve casing 28 is provided with six operating ports as shown in Fig. 4, and designated by the numbers 41 to 46 inclusive, which communicate through the passageways 51 to 56 inclusive with the corresponding pipes 31 to 34 inclusive, and pipe 36 shown in Figs. 1 to 8, while the port 45 communicates with the faucet 27 through the passage 55. The port 46 communicates through the passage 56 with the pipe 36 leading to the syrup supply tank 80 shown in Fig. 1. As will be seen from Fig. 1, port 41 through the passage 51 and the piping 31 connects directly with the tank 9 thereby conducting to said port at all times, the live carbonating gas. The port 43, and the piping 33 communicating with said port through the passage 53, are provided to conduct the live gas from tank 9 to the first absorption chamber 10 of the absorption or charging battery 5, in the inoperative or vertical position of the handle shown in Figs. 4 and 5. The port 44 communicating with the pipe 34 through the passage 54 in the casing 28 of the valve is provided to convey live gas from tank 9 through piping 31 and port 41 to the top of the volume chamber 23, in the inclined operative or open position of the handle as indicated in Fig. 7, to thereby force the measured quantity of carbonated water in said volume chamber 23 through the pipe 32, the passageway 52 and the port 42, out through the port 45 into the faucet 27 for the purpose of discharging the same.

In order to effect the proper opening and closing of the ports 41 to 46 inclusive, and also to effect the interconnection of the proper ports, there is provided a movable valve disc 30 mentioned hereinbefore, shown in Figs. 5 to 7 inclusive in three positions thereof, having a number of ports 61 to 66 inclusive corresponding in position to the ports 41 to 46 inclusive in the stationary portion of the valve, and coinciding with the said respective ports in the open position of the valve indicated in Fig. 7; namely, when the handle 4 is fully inclined (approximately 45 degrees). In Figs. 5 to 7 inclusive showing the closed, midway, and fully opened positions of the valve disc 30, the solid circles indicate the ports 61 to 66 inclusive of the valve disc, while the dotted circles in said figures indicate the corresponding ports 41 to 46 inclusive in the face of the stationary casing 28 of the valve, shown in full lines in Fig. 4.

In order to effect the proper interconnection between the particular desired ports in the valve casing 28, the disc 30 is provided with bypasses or passageways 71 to 74 inclusive, as well as 76 as shown in Figs. 5 to 7 inclusive. Thus the bypass or passageway 71 interconnects the ports 61 and 64 as will be seen in Figs. 5 to 7 inclusive, thereby conveying the live gas from tank 9 through the piping 31 and the port 41, to the port 43 and the piping 33, to the first stage absorption chamber 10; in the closed or inoperative position of the handle shown in Fig. 5. When the handle 4, however, is drawn forward to an angle of approximately 45 degrees, as shown in Fig. 7, ports 64 and 61 are displaced so as to coincide with the ports 44 and 41, and to convey the live gas from pipe 31 to port 44, from whence it is conveyed through the piping 34 to the top of the volume chamber 23, to exert the full pressure of the live gas on the quantity of carbonated water confined therein. At the same time in the open position of the handle as shown in Fig. 7, moreover, the port 65 is brought from the position shown in Fig. 5 to the position shown in Fig. 7 where it coincides with the port 45 in the casing to thereby complete a path for the liquid in the volume chamber 23, through the piping 32 and port 42 in the center of the valve casing face, and through the bypass 72, interconnecting port 62 and port 65, to the port 45 in the casing from whence the measured liquid in the volume chamber 23 under the pressure of the live gas from piping 34, is forced out through the passage 55 and the faucet 27. The bypass 73 between ports 63 and 65, is provided to establish a path from port 43 to port 45 in the open position of the valve shown in Fig. 7. Through this passageway, the discharging water flowing through the bypass 72, jets the gas remaining in the piping 33, out through the port 45 and the faucet 27, thereby relieving the pressure from the chamber 10. This jetting action of the stream of discharging water through the bypass 72 and the port 45, on the gas in pipe 33 through the bypass 73, also tends to create a vacuum in said chamber 10 due to the check valve 81 on the top of the pipe 12 in chamber 13, which prevents the passage of any gas or water from chamber 13 to chamber 10. The vacuum thus produced during the discharge at the faucet 27, raises the check valve 82 resting on the valve seat 83 of the water supply intake 84 in the manifold 8, and draws in a fresh supply of water to be charged in the battery 5, and to be subsequently passed through the measuring or volume chamber 23 and hence through the valve 1 to the faucet 27.

In order to relieve the pressure of the gas in volume chamber 23, after said chamber has been emptied, so as to permit the refilling of the same, there is provided a small auxiliary bypass 74 within the disc 30, terminating in the two small ports 67 and 68, so positioned that they will coincide with the ports 44 and 43 respectively in the valve casing 28, in the midway position of the movement of the disc 30 and hence in the midway position (approximately 22½ degrees) of the handle. Thus when the handle is reversed from the open position shown in Fig. 7 to the position shown in Fig. 5, it passes through the intermediate position shown in Fig. 6, in which position the bypass 74 through the ports 67 and 68, interconnects the ports 44 and 43 of the casing, thereby establishing a path for the gas under pressure, in the volume chamber 23, with the chamber 10, which has previously been subjected to vacuum, and thereby relieves the gas from the volume chamber 23. Thereafter the handle 4 and the valve disc 30 are returned the inoperative or closed position shown in Fig. 5, in which position the live gas from the tank 9, through the piping 31 and 33 and the ports 41 and 43, and ports 64 and 61 respectively, is again conveyed directly to the absorption chamber 10, thereby subjecting the water drawn into said chamber by the previous vacuum, to the charging or carbonating process, through the series of charging or absorption chambers 10, 13 and 19 respectively.

In addition to the ports and bypasses described hereinbefore for the purpose of effecting the proper carbonation and discharge of the water, there is provided another port 46 in the valve casing 28 which communicates with the piping 36, through the passage 56 in said casing; which piping 36 supplies the said port at all times, with a syrup from tank 80, which syrup forms an ingredient of the completed beverage to be discharged through the faucet 27. While in the drawings only one such syrup port 46 has been shown, it is within the scope of our invention to provide any number of such ports spaced apart, for the purpose of supplying a plurality of different kinds of syrups or other fluid ingredients of a beverage. To convey the syrup from the syrup port 46 to the discharge port 45 in the casing and hence out through the passageway 55 to the faucet 27, we provide a corresponding syrup port or ports 66 in the movable disc 30 of the valve, which communicates with the port 65 of said disc by means of the bypass 76 in said disc 30, to thereby effect such communication between the syrup port 46 and the discharge port 45 of the casing.

Figure 2:
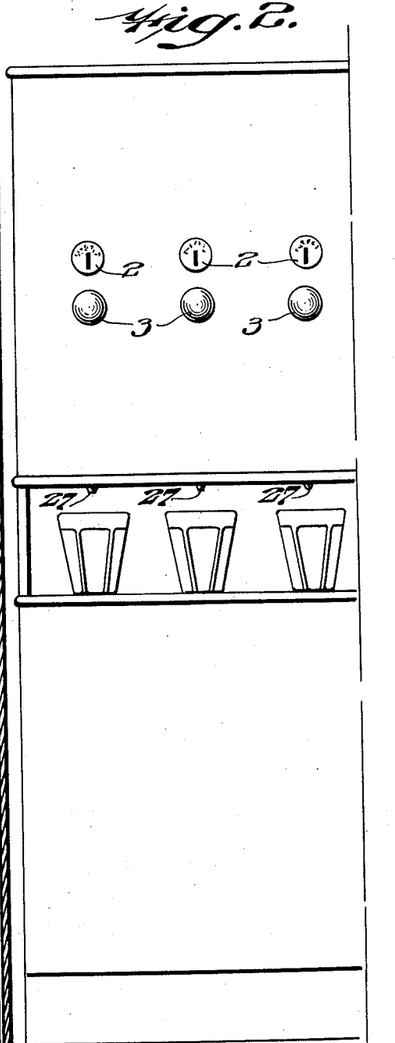
Fig. 2 represents a front elevation of the same.

The valve 1 shown in Figs. 3 and 4 consists of the valve housing 28 provided with the valve face 85, the packing gasket 29 and the movable disc 30 bearing against said packing gasket 29. In order to engage the disc 30, so as to permit the proper positioning of the same, said disc is provided with a projection or rib 86 extending diametrically across said disc, which rib extends into a corresponding slot or recess in the stem portion 87. The stem portion 87 is secured, to the casing in a rotatable manner, by the collar 88 which overlaps the shoulder 89 of said stem portion, and which is in threaded engagement with the body of the casing 28, as shown at 90. The stem portion 87 is provided with a slot 91 extending through the same, whereby engagement is effected between said stem and the operating or actuating handle 4. Thus the handle 4 is provided with a forked end 92, embracing the valve casing 28, one prong 93 of which extends into said slot 91, while the other prong 94 is pivotally secured to the casing 28 by means of the pivot pin 95 passing through said prong 94 into the casing 28. While in Figs. 3 and 4 there is shown a handle 4 of the manually operated type such as are commonly used on soda water fountains, said valve is adaptable to the "automat" type, or, coin controlled beverage dispensing devices, as shown in Figs. 1 and 2. In order to permit the ready adjustment at all times, of the valve disc, there is provided a set screw 96 passing through the stem 87 as well as the prong 93, and bearing against the disc 30. The screw 96 is provided with a knurled head 97, whereby it may be readily adjusted so as to obtain the desired pressure between the disc and the valve seat gasket 29.

It will be noticed in Fig. 1 that the charging or absorption battery 5 and the volume chamber 23 are all mounted on a single manifold 8, thereby forming a unitary structure which may be positioned in any suitable manner with respect to the cooling chamber 97, although in the preferred embodiment of my invention shown in Fig. 1, said battery 5 and volume chamber 23 are placed at the bottom of the cooling chamber 97, and the ice and water mixture are simply allowed to surround the same completely. For the purpose of draining the manifold 8 there is provided a plug 98, as shown in Fig. 8 in the bottom of the manifold, which may be removed and the water allowed to drain.

Figure 12:
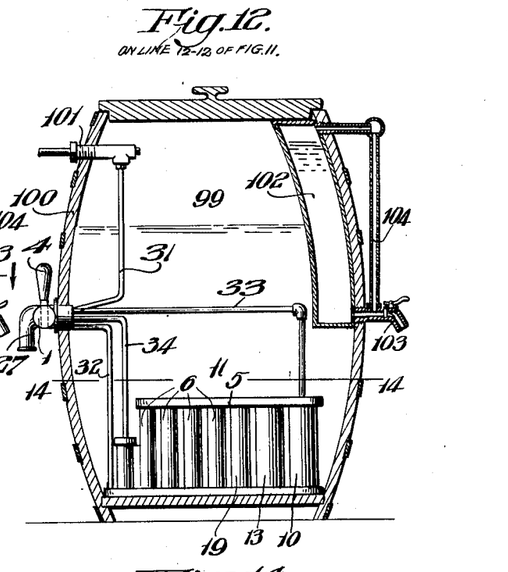
Fig. 12 represents a section on line 12—12 of Fig. 11.
Figure 13:
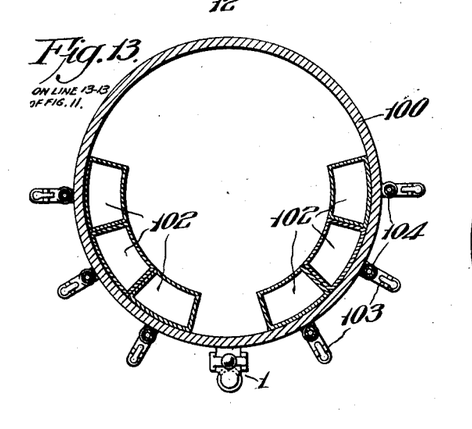
Fig. 13 represents a section on line 13—13 of Fig. 11.
Figure 14:
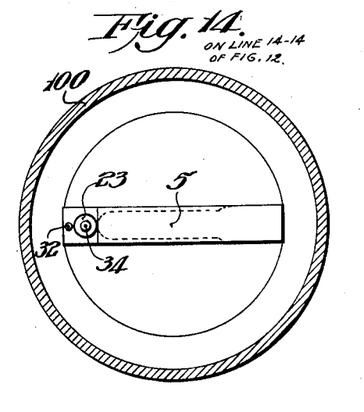
Fig. 14 represents a section on line 14—14 of Fig. 12.

In Figs. 11 to 14 inclusive there is shown a second embodiment of our invention, in form of a portable beverage dispensing unit, in contradistinction to the stationary beverage dispensing unit shown in Figs. 1 and 2. This consists chiefly of a cooling chamber 99 within a barrel 100, adapted to contain the ice and water mixture, into the bottom of which chamber is placed the charging or absorption battery 5 and the volume chamber 23. The valve 1 is secured to, and passes through, the wall of the barrel 100 as shown in Fig. 12, while the carbonating gas is supplied from a tank located in the vicinity of the barrel through the coupling 101 as shown in Fig. 12. In this modification the valve 1 is not provided with syrup ports and is used entirely for the charging and dispensing of the carbonated water. The syrups are stored in smaller storage tanks 102 secured to the inner wall of the barrel, as shown in Figs. 12 and 13, which are immersed partly in the cooling mixture of ice and water, within the cooling chamber 99. Each of said syrup storage tanks, 102 is provided with an independent valve and faucet 103 and a measuring tube 104 for gaging the quantity of syrup drawn.

By our novel carbonating and dispensing device we are enabled to continuously charge a given quantity of water, and to measure the same automatically by a single operation of the control valve. We are further enabled to mix with a single operation of the control valve, one or a plurality of different syrups or other liquids with the carbonated water. Our novel carbonating device aside from being highly efficient can also be produced at a lesser cost than charging and dispensing devices known heretofore.

It will now be apparent that we have devised a novel and useful construction of a carbonator and draft arm for soda water, which embodies the features of advantage enumerated as desirable in the statement of the invention and the above description, and while we have, in the present instance, shown and described a preferred embodiment thereof which has been found in practice to give satisfactory and reliable results, it is to be understood that the same is susceptible of modification in various particulars without departing from the spirit or scope of the invention or sacrificing any of its advantages.

Having thus described our invention what we claim as new and desire to secure by Letters Patent, is:—

1. In a device of the character described, an absorption chamber, a volume chamber, a control valve, a gas supply pipe connected to said valve, a gas conveying pipe leading from said valve to said absorption chamber, a passageway interconnecting said absorption chamber with said volume chamber, a check valve interposed between said absorption chamber and volume chamber to permit the passage from the former to the latter only, a gas pressure pipe interconnecting said valve and said volume chamber, and a discharge pipe communicating with said volume chamber of said valve.

2. In a device of the character described, an absorption chamber, a volume chamber, a passageway and a check valve interposed between the two, a control valve operatively connected to said absorption chamber, said volume chamber, and to the source of gas supply, ports and passageways within said valve to conduct the gas to the absorption chamber in the inoperative position of the handle, and to conduct the gas to the volume chamber in the operative position of the handle, a discharge pipe communicating with said volume chamber and said valve, and ports and a passageway within said valve to release the contents of the volume chamber in the operative position of the valve.

3. In a device of the character described, an absorption chamber, a volume chamber, a control valve, a gas supply port and passageway in said valve, a pipe connecting said absorption chamber with said valve, ports and passageways to connect said gas supply port with said absorption chamber in the inoperative position of the handle, a pressure pipe and discharge pipes interconnecting said valve and said volume chamber, and ports and passageways within said valve to connect the gas supply with the pressure pipe and the discharge pipe with a faucet in the operative position of the valve.

4. In a device of the character described, an absorption chamber, a volume chamber, a control valve, a gas supply port and passageway in said valve, a pipe connecting said absorption chamber with said valve, ports and passageways to connect said gas supply port with said absorption chamber in the inoperative position of the handle, a pressure pipe and discharge pipes interconnecting said valve and said volume chamber, ports and passageways within said valve to connect the gas supply with the pressure pipe and the discharge pipe with a faucet in the operative position of the valve, and a bypass and ports interconnecting the pressure pipe with the absorption chamber in an intermediate position of the handle.

5. In a device of the character described, an absorption chamber, a volume chamber, a control valve, a gas supply port and passageway in said valve, a pipe connecting said absorption chamber with said valve ports and passageways to connect said gas supply port with said absorption chamber in the inoperative position of the handle, a pressure pipe and discharge pipes interconnecting said valve and said volume chamber, ports and passageways within said valve to connect the gas supply with the pressure pipe and the discharge pipe with a faucet in the operative position of the valve, a jetting passageway within said valve to connect the absorption chamber with the discharging liquid in the operative position of the handle to thereby create a vacuum in the absorption chamber.

6. In a device of the character described, an absorption chamber, a volume chamber, a control valve, a gas supply port and passageway in said valve, a pipe connecting said absorption chamber with said valve, ports and passageways to connect said gas supply port with said absorption chamber in the inoperative position of the handle, a pressure pipe and discharge pipes interconnecting said valve and said volume chamber, and ports and passageways within said valve to connect the gas supply with the pressure pipe and the discharge pipe with a faucet in the operative position of the valve, a jetting passageway within said valve to connect the absorption chamber with the discharging liquid in the operative position of the handle to thereby create a vacuum in the absorption chamber, and a bypass and ports interconnecting the pressure pipe with the absorption chamber in an intermediate position of the handle.

7. In a device of the character described, an absorption battery comprising a plurality of absorption chambers, a water intake pipe communicating with the first of said chambers, a volume chamber communicating with the last of said chambers, a check valve intermediate the last of said chambers and said volume chamber, a control valve, a gas supply port and passageway in said valve and a gas pipe connecting said valve and said absorption chamber, a gas pressure pipe and a liquid discharge pipe connecting said volume chamber with said valve and ports and passageways within said valve, to connect said gas supply port with the absorption chamber, and to completely shut the pressure pipe and liquid discharge pipe, ports and passageways within said valve, to convey the gas supply to the pressure pipe in the operative position of the handle and to open said discharge pipe, and a jetting passageway within said valve connecting the said absorption chamber with the discharging liquid in the operative position of handle to thereby jet the gas within said absorption chamber and thereby create a vacuum.

8. In a device of the character described, an absorption battery comprising a plurality of absorption chambers, a water intake pipe communicating with the first of said chambers, a volume chamber communicating with the last of said chambers, a check valve intermediate the last of said chambers and said volume chambers, a control valve, a gas supply port and passageway in said valve and a gas pipe connecting said valve and said absorption chamber, a gas pressure pipe and a liquid discharge pipe connecting said volume chamber with said valve and ports and passageways within said valve, to connect said gas supply port with the absorption chamber, and to completely shut the pressure pipe and liquid discharge pipe, ports and passageways within said valve to convey the gas supply to the pressure pipe in the operative position of the handle and to open said discharge pipe,—a jetting passageway within said valve connecting the said absorption chamber with the discharging liquid in the operative position of handle to thereby jet the gas within said absorption chamber and thereby create a vacuum, and a bypass within said valve to connect said volume chamber with said absorption chamber in an intermediate position of the valve, to thereby relieve the pressure within the volume chamber during the reverse stroke of the handle.

WILLIAM C. DE ARMOND.
WILLIAM RAY H. WATT.